Figure 1:
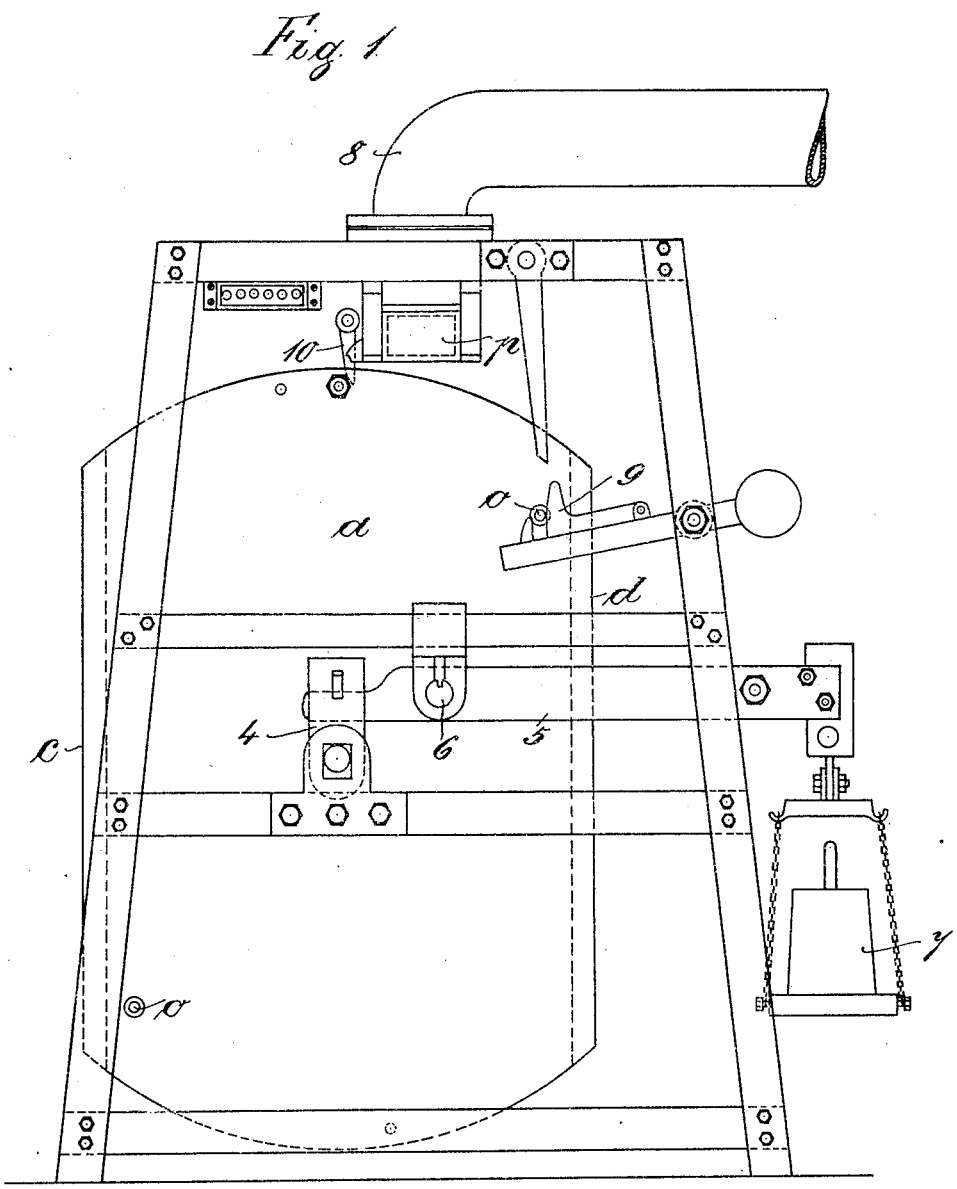

H. W. MEYER.
RECEPTACLE FOR LIQUID WEIGHING MACHINES.
APPLICATION FILED NOV. 6, 1909.

956,775.

Patented May 3, 1910.
2 SHEETS—SHEET 1.

Witnesses:
Jacob L. Diamond
James H. Goggin

Inventor:
Heinrich Wilhelm Meyer,
by L. K. Böhm,
Attorney.

H. W. MEYER.
RECEPTACLE FOR LIQUID WEIGHING MACHINES.
APPLICATION FILED NOV. 6, 1909.
956,775.
Patented May 3, 1910.
2 SHEETS—SHEET 2.
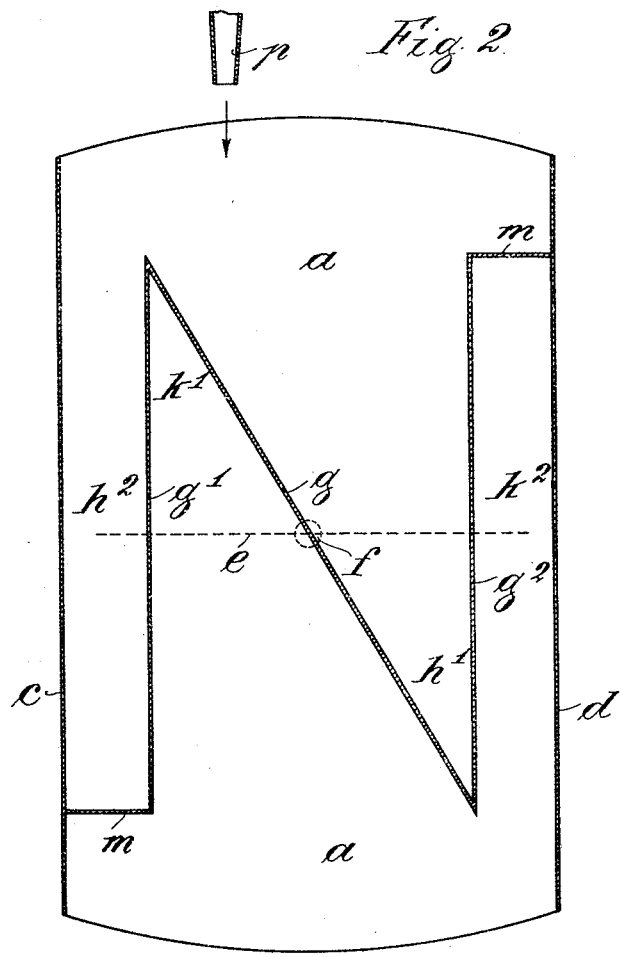
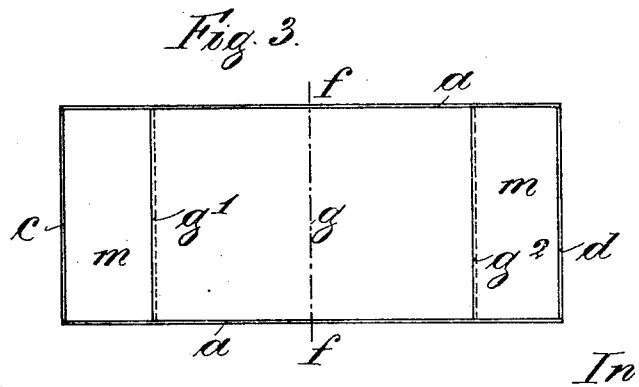
Witnesses:
Jacob Diamond
James H. Goggin
Inventor:
Heinrich Wilhelm Meyer
by L. K. Böhm,
Attorney

UNITED STATES PATENT OFFICE.

HEINRICH WILHELM MEYER, OF ZEHLENDORF, NEAR BERLIN, GERMANY.

RECEPTACLE FOR LIQUID-WEIGHING MACHINES.

956,775.  Specification of Letters Patent.  Patented May 3, 1910.

Application filed November 6, 1909. Serial No. 526,542.

*To all whom it may concern:*

Be it known that I, HEINRICH WILHELM MEYER, a subject of the King of Prussia, and resident of 2 Grunewald Allee, Zehlendorf, near Berlin, German Empire, have invented new and useful Improvements Relating to the Receptacles of Liquid-Weighing Machines, of which the following is a specification.

This invention relates to improvements in the receptacles of those liquid weighing machines in which the liquid container is divided into two chambers and is rotatably mounted. In such weighing machines the upper compartment is filled while the lower compartment is discharging the liquid. This arrangement offers considerable conveniences but when the receptacle is of large capacity the masses being moved during discharging are so considerable that shocks are caused to the weighing apparatus which renders the usual double-chambered receptacles impracticable for weighing large quantities.

According to the present invention the drawbacks present in former constructions are avoided by arranging the division wall between the two chambers of the receptacle in such a manner as to avoid all shocks. For this purpose the division wall is arranged inclined upwardly toward the pouring edge and having its deepest point at the side of the receptacle opposite to the pouring edge. In this way when the receptacle is being filled the bulk of the weight is on that side of the receptacle remote from the pouring edge whereby the receptacle is caused to rest against the stop. When the required quantity of liquid has been filled into the receptacle, the said receptacle is rotated and the inclined division wall gradually assumes a horizontal position and then inclines downwardly toward the pouring point whereby a much gentler pouring action is secured which is of considerable importance in large weighing machines. Further the tilting takes place much more uniformly and regularly on account of the fact that part of the weight of the liquid acts as a counterweight. In order to produce equality of weight on each side of the center of rotation of the receptacle or in order to produce a slightly greater weight on the pouring side I arrange a pocket at the pouring side opening upward toward the pouring edge.

The invention will be more readily understood from the following description of the accompanying drawings, in which—

Figure 1 is an outside elevation of a weighing machine for liquids having a double ended receptacle according to the present invention. Fig. 2 is a vertical section through the receptacle showing the arrangement of the internal division wall. Fig. 3 is a plan of the device shown in Fig. 1.

The general arrangement of the weighing machine to which the present invention is applicable will be understood from the following short description of Fig. 1. The receptacle $a$ is rotatably mounted in straps 4 supported on a weighing lever 5 pivoted at 6. The lever 5 is adapted to be weighted by weights 7. The liquid to be weighed passes through a pipe 8 to a valve $p$ which is controlled automatically by the receptacle. Normally the receptacle in Fig. 1 tends to rotate clockwise so that the pin $o$ fixed to the side of the receptacle tends to rest against a stop lever 9. When however the desired quantity of liquid is nearly filled into the receptacle the said receptacle tends to rotate counter-clockwise and thereby operates the lever 10 of a trip gear for the valve $p$ so that the liquid passes more slowly to the receptacle during the last stage of the weighing. When the complete weight is filled in the lever 5 oscillates about its pivot 6 and thereby the lever 10 is completely released and the valve $p$ completely closed.

The device described forms no part of the present invention and is merely illustrated and described generally herein so as to assist in the full understanding of the improved form of receptacle hereinafter described more particularly with reference to Figs. 2 and 3. The weighing machine generally and the valve with its trip gear have already been described in U. S. Patents No. 917,882 and No. 921,428.

According to the form illustrated the receptacle is composed of two side plates $a$ $a$ closed by plates $c$ $d$ to form the side walls of the receptacle. The receptacle is divided into two compartments by an inclined partition $g$. The inclined partition $g$ is arranged to incline upwardly toward the pouring edge. In the position illustrated the pouring edge is the lefthand top edge in Fig. 1. The consequence of this upward inclination of the partition $g$ is that the lowest point of the chamber is to that side of the axis $f$ of the receptacle remote from the pouring edge. With reference to the pouring edge $c'$ the pocket $h'$ forms the deepest point referred to while with reference to the pouring edge $d'$ the pocket $k'$ will represent the deepest point referred to. The entire division plate it will be seen is in the form of an N in vertical cross section. When now liquid is introduced into the receptacle through the supply pipe $p$ this liquid fills the pocket $h'$ and thereby causes the receptacle to lean or press against the stop $o$. When tilting the receptacle the pocket $h'$ forms a counterweight and thereby avoids to a great extent all shocks such as would be encountered if the partition plate were arranged as shown by the dotted lines $e$. In order to counteract the excessive weight on the non-pouring side of the receptacle I arrange pockets $h^2$ and $k^2$ which are formed by the plates $g^2$ and $m$. In this way the entire division wall between the two compartments of the receptacle is composed of the plates $m$, $g'$, $g$, $g^2$ and $m$. When the triangular pocket formed by the walls $g$ and $g^2$ is filled and the liquid continues to be supplied from the pipe $p$, this extra liquid flows into the pocket $h^2$ and gradually establishes equality of weight on each side of the axis of rotation $f$. The effect of this pocket is also to render the pouring less abrupt, as the part of the pocket below the axis $f$ acts as a counterweight during pouring and the material in the pocket $h^2$ only starts to flow after the angle of tilt is fairly considerable.

I claim:—

1. In a liquid weighing machine of the type described a rotatable weighing receptacle, comprising side walls and a division plate dividing said receptacle into two compartments, said division plate being inclined for part of its length upwardly toward the pouring edge, substantially as described.

2. In a liquid weighing machine of the type described a rotatable weighing receptacle, comprising side walls and a division plate dividing said receptacle into two compartments, said division plate being inclined for part of its length upwardly toward the pouring edge and then bent downwardly to form a pocket at the side of the receptacle on which the pouring edge is situated.

3. In a liquid weighing machine of the type described, a weighing lever, a receptacle for the liquid to be weighed, said receptacle being rotatably mounted on said lever and a division plate within said receptacle for dividing it into two compartments, said division plate being of N-form in vertical cross section.

In witness whereof I have hereunto set my hand in the presence of two witnesses.

HEINRICH WILHELM MEYER.

Witnesses:
   HENRY HASPER,
   THERESE HERPICH.